United States Patent [19]

Yoshida

[11] Patent Number: 4,685,098
[45] Date of Patent: Aug. 4, 1987

[54] APPARATUS FOR REPRODUCING DATA SIGNAL

[75] Inventor: Tadao Yoshida, Kawasaki, Japan

[73] Assignee: Sony Corporation, Tokyo, Japan

[21] Appl. No.: 673,752

[22] PCT Filed: Mar. 8, 1984

[86] PCT No.: PCT/JP84/00091
§ 371 Date: Nov. 7, 1984
§ 102(e) Date: Nov. 7, 1984

[87] PCT Pub. No.: WO84/03581
PCT Pub. Date: Sep. 13, 1984

[30] Foreign Application Priority Data

Mar. 8, 1983 [JP] Japan .................................. 58-38053

[51] Int. Cl.[4] .......................... H04N 5/76; G11B 5/09
[52] U.S. Cl. ........................................ 369/59; 369/48
[58] Field of Search ....................... 369/59, 48; 360/67

[56] References Cited

U.S. PATENT DOCUMENTS 4,572,965  2/1986  Yamamura ............................ 369/59

Primary Examiner—Vincent P. Canney
Attorney, Agent, or Firm—Lewis H. Eslinger; Alvin Sinderbrand

[57] ABSTRACT

A data signal reproducing apparatus reproduces digital data from a recording medium on which a digital data signal modulated in accordance with the run length limited code modulation is recorded together with a synchronous signal. The apparatus is improved so that erroneous detection of a false synchronous signal is avoided when there is a defective part on the recording surface of the recording medium. In the apparatus, a reproduced signal of rectangular waveform from waveform shaping means (9) is prevented from being supplied to reproduced signal processing means (13) when the amplitude of a head output signal detected by amplitude detecting means (14 to 17) is less than a predetermined value, thereby avoiding erroneous detection of the false synchronous signal. The apparatus is suitable for being constituted to be a player for a digital audio disc.

10 Claims, 3 Drawing Figures

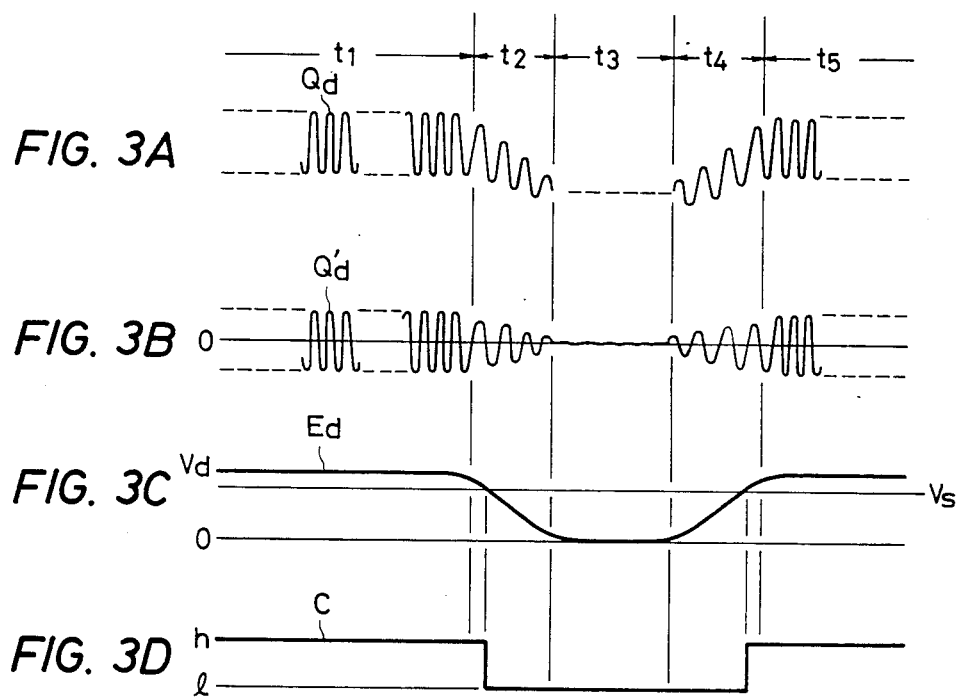

APPARATUS FOR REPRODUCING DATA SIGNAL

TECHNICAL FIELD

The present invention relates to apparatus for reproducing a data signal from a recording medium, such as an optical digital audio disc, having a track on which is recorded a digital data signal modulated in accordance with a modulation system in which the interval between each two successive level transitions from one to the other of two different levels corresponding to binary data "1" and "0", respectively, is provided in a predetermined manner so that the data signal is recorded with constant recording density together with a synchronous signal.

TECHNICAL BACKGROUND

In the optical digital audio disc which is a rotatable disc provided with a spiral recording track on which an audio signal digitalized in accordance with the pulse code modulation (PCM) is recorded with constant recording density so as to be optically read out, the digital data signal recorded thereon is formed into a predetermined format which, for example, contains a series of frame units, each of which is formed with, for example, 588 channel bits to include a frame synchronous signal at the beginning and a data portion following the frame synchronous signal. When the digital data signal thus formed is recorded on the optical digital audio disc, the so-called run length limited code modulation is adopted. The run length limited code modulation in a modulation system in which two different levels of the recording signal are provided in accordance with each binary data "0" and each "1", respectively, and the minimum run length (the minimum interval between two successive level transitions) is made relatively long, so that recording efficiency is increased. Moreover, the maximum run length (the maximum interval between two successive level transitions) is made relatively short so that self-clocking in the reproducing process is facilitated. The maximum run length is arranged to correspond to, for example, 11 channel bits and the minimum run length is arranged to correspond to, for example, 3 channel bits. In addition, since the maximum run length does not appear successively in the normal modulated output, a specific pattern of waveform formed with two successive intervals at the levels of "1" and "0" each corresponding to the maximum run length is added to the modulated output to be used as the frame synchronous signal.

In data, signal reproducing apparatus that uses a reading light beam to reproduce a data signal from an optical recording medium, such as an optical digital audio disc, on which a digital data signal having a waveform obtained by the run length limited code modulation, wherein the maximum run length and the minimum run length are fixed appropriately is recorded with constant recording density together with a synchronous signal having the pattern of waveform formed with two successive intervals each corresponding to the maximum run length, the optical recording medium is driven to move so that the recording track of the optical recording medium is scanned at a constant velocity by a reading device, that is, an optical head of the apparatus for emitting the reading light beam, and thereby the digital data signal recorded on the optical recording medium is read by the reading light beam to produce a head output signal.

The head output signal thus obtained is supplied to a level comparing circuit forming a waveform shaping portion wherein the level of the head output signal is compared with a predetermined level (a cut-off level) and shaped into a rectangular waveform taking, for example, a level of "1" when the level of the head output signal is equal to or higher than the cut-off level and a level of "0" when the level of the head output signal is lower than the cut-off level.

In the case of the optical digital audio disc, for example, since the digital data signal recorded thereon is modulated as described above, a reproduced signal with a rectangular waveform obtained by shaping the head output signal from the disc is formed to contain a series of frame periods, each of which commences with a frame synchronous signal formed with two successive intervals each corresponding to the maximum run length Tmax of 11 channel bits and a data portion following frame synchronous signal which includes intervals corresponding to the levels of "1" and "0", respectively, and appearing alternately in response to the contents of the digital data signal recorded on the disc. With this rectangular reproduced signal, the reproduction of bit clock pulses and the detection of the frame synchronous signal are carried out, then the data portion of the rectangular reproduced signal is demodulated with the reproduced bit clock pulses in synchronism with the detected frame synchronous signal to produce demodulated digital data and the demodulated digital data are subjected to error correction and other necessary processing.

In processing such a rectangular reproduced signal as mentioned above, the synchronization with the detected frame synchronous signal is very important. If this synchronization is improper or insufficient, correctly demodulated digital data can not be obtained and proper error correction for the demodulated digital data can not be performed so that noise components arise conspicuously. Accordingly, it is required to detect accurately the frame synchronous signal in the rectangular reproduced signal for processing the rectangular reproduced signal. The detection of the frame synchronous signal in the rectangular reproduced signal is carried out by detecting a specific pattern in the waveform of the rectangular reproduced signal which is formed with two successive intervals each corresponding the maximum run length. It is not difficult to detect accurately the frame synchronous signal in the rectangular reproduced signal when the digital data signal is properly read from the optical record medium by the reading light beam.

However, in the case where the optical recording medium has a light reflective recording surface on which the digital data signal is recorded in the form of variations in geometrical shape, for example, small pits arranged in a spiral track, such as found in an optical digital audio disc, and the digital data signal is read by detecting the variations in intensity of the reading light beam reflected at the light reflective recording surface of the optical recording medium after impinging thereon, if the light reflective recording surface of the optical recording medium has a non-reflecting defective portion, the digital data signal is not properly read by the reading light beam at such a non-reflecting defective portion, as well as at the peripheral portions thereof. This results in a possibility of erroneous detection of the frame synchronous signal caused when the reading light beam scans the non-reflecting defective portion and the peripheral portion thereof, especially, when the reading light beam enters or exists the non-reflecting defective portion.

For example, when the digital data signal recorded on the optical record medium is read properly at the portion of the light reflective recording surface where the pits P are arranged as shown in FIG. 1A, a head output signal Q having the level which varies higher and lower than a cut-off level L in accordance with the existence and absence of the pit P as shown in FIG. 1B is obtained. The head output signal Q is compared with the cut-off level L and waveform-shaped to produce a rectangular signal S having a level which varies in response to the arrangement of the pits P on the light reflective recording surface, as shown in FIG. 1C.

On the other hand, when the portion of the light reflective recording surface where the pits P are arranged as shown in FIG. 1A is located at the front or the rear of a non-reflecting defective portion provided undesirably on the light reflective recording surface, the reading light beam is adversely affected by the non-reflecting defective portion to deteriorate the focusing condition thereof at the portion where the pits P are arranged as shown in FIG. 1A, so that the detected variations in intensity of the reading light beam reflected at the light reflective recording surface do not follow faithfully the arrangement of the pits. Accordingly, the digital data signal recorded on the optical recording medium is not properly read by the reading light beam and a head output signal $Q'$ which is deteriorated in frequency characteristics as shown in FIG. 1D is obtained. The variations in the level of this head output signal $Q'$ to be higher and lower than the cut-off level L do not fully respond to the existence and absence of the pit P, and consequently a rectangular reproduced signal $S'$ which has enlarged intervals $T_1'$ and $T_2'$ between respective level transitions thereof without varying in level in response to the arrangement of the pits P as shown in FIG. 1E is obtained.

In such a case, there is a high probability that the enlarged intervals $T_1'$ and $T_2'$ as mentioned above will occur and form a pattern of waveform similar to the pattern of waveform formed with successive intervals each corresponding to the maximum run length, that is, the pattern of the frame synchronous signal in the rectangular reproduced signal S appropriately obtained as shown in FIG. 1C. If that occurs, the enlarged intervals $T_1'$ and $T_2'$ in the rectangular reproduced signal $S'$ will be erroneously detected as a frame synchronous signal.

In this connection, when the data portion of the rectangular reproduced signal $S'$ is demodulated in the condition of synchronism with the false frame synchronous signal erroneously detected as mentioned above to produce demodulated digital data and then the demodulated digital data are subjected to error correction and other necessary processing, the problem that erroneous output signals, that is, noise components arise conspicuously is caused.

DISCLOSURE OF THE INVENTION

Accordingly, it is an object of the present invention to provide an apparatus for reproducing a data signal in which a reading light beam from an optical head is caused to impinge on an optical recording medium having a light reflective recording surface on which a digital data signal modulated in accordance with the run length limited code modulation is recorded with constant recording density together with a synchronous signal with a waveform formed with successive two intervals each corresponding to the maximum run length in order to read the digital data signal and produce a head output signal, then the synchronous signal in the head output signal is detected to be used for demodulating the head output signal to produce demodulated digital data, and which can avoid detecting erroneously a false synchronous signal when the reading light beam scans a portion of the light reflective recording surface at the front or the rear of a non-reflecting defective portion on the light reflective recording surface.

In the present invention, in connection with the detection of the variations in intensity of the reading light beam reflected at the light reflective recording surface on the optical reading medium to obtain the head output signal, it is specifically taken into consideration that the head output signal obtained from the portion of the light reflective recording surface at the front or the rear of the non-reflecting defective portion is not only deteriorated in frequency characteristic so as to bring about the possibility of erroneous detection of the false synchronous signal but also reduced in amplitude, and an arrangement is provided to detect the amplitude of the head output signal obtained from the optical recording medium and to check whether the head output signal is obtained from the portion of the light reflective recording surface at the front or the rear of the non-reflecting defective portion or not on the strength of the result of the amplitude detection for the head output signal. Further, an arrangement is also provided for preventing the false synchronous signal from being detected erroneously when it is clarified that the head output signal is obtained from the portion of the light reflective recording surface at the front or the rear of the non-reflecting defective portion.

In the apparatus for reproducing data signal according to the present invention, the head output signal, which is obtained as a result of reading the digital data signal modulated in accordance with the run length limited code modulation and recorded on the optical recording medium together with the synchronous signal, is supplied to a waveform shaping portion in which the level of the head output signal is compared with a predetermined level to be shaped into a rectangular reproduced signal, then the rectangular reproduced signal is supplied to a reproduced signal processing portion comprising synchronous signal detecting means and demodulating means for producing demodulated digital data, and furthermore, the rectangular reproduced signal is prevented from being supplied to the reproduced signal processing portion when the amplitude of the head output signal, which is detected by an amplitude detecting portion, is less than a predetermined value.

With the apparatus for reproducing a data signal thus constituted according to the present invention, when the head output signal is obtained from a portion of the light reflective recording surface of the optical recording medium at the front or the rear of a non-reflecting defective portion provided undesirably on the light reflective recording surface and it is feared that erroneous detection of a false synchronous signal is caused, the rectangular reproduced signal obtained by waveform-shaping the head output signal is not supplied to the reproduced signal processing portion, so that it is surely avoided that the false synchronous signal is erroneously detected in the reproduced signal processing portion. Consequently, noise components contained in demodulated digital data derived from the reproduced signal processing portion are sufficiently reduced and the demodulated digital data superior in quality are obtained.

BRIEF DESCRIPTION OF THE DRAWINGS

FIGS. 3A to 3D are waveform diagrams used for explaining the operation of the embodiment shown in FIG. 2.

Now, a preferred embodiment of the present invention will be described with reference to the accompanying drawings, hereinafter.

Figure 1:
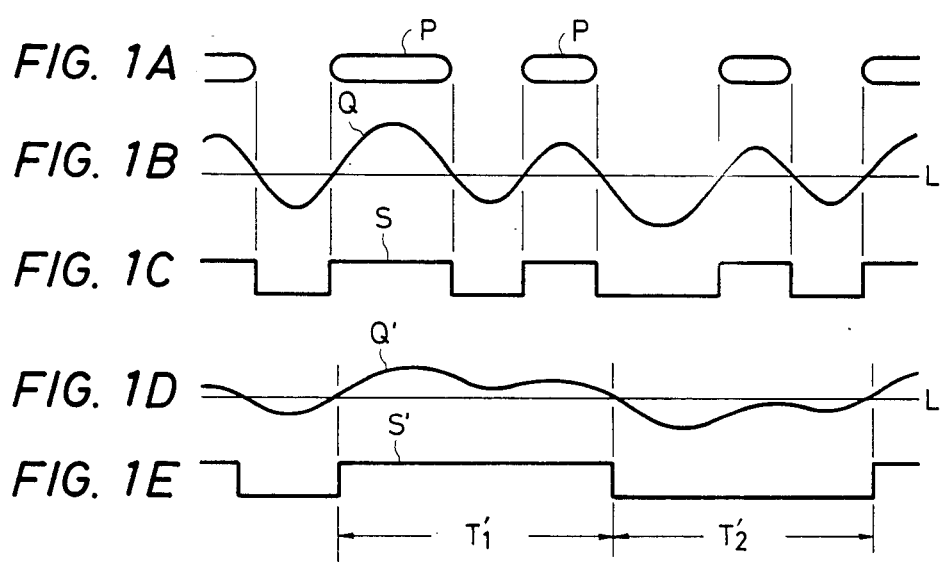
FIGS. 1A to 1E are illustrations used for explaining erroneous detection of a false synchronous signal in a head output signal obtained from an optical recording medium.
Figure 2:
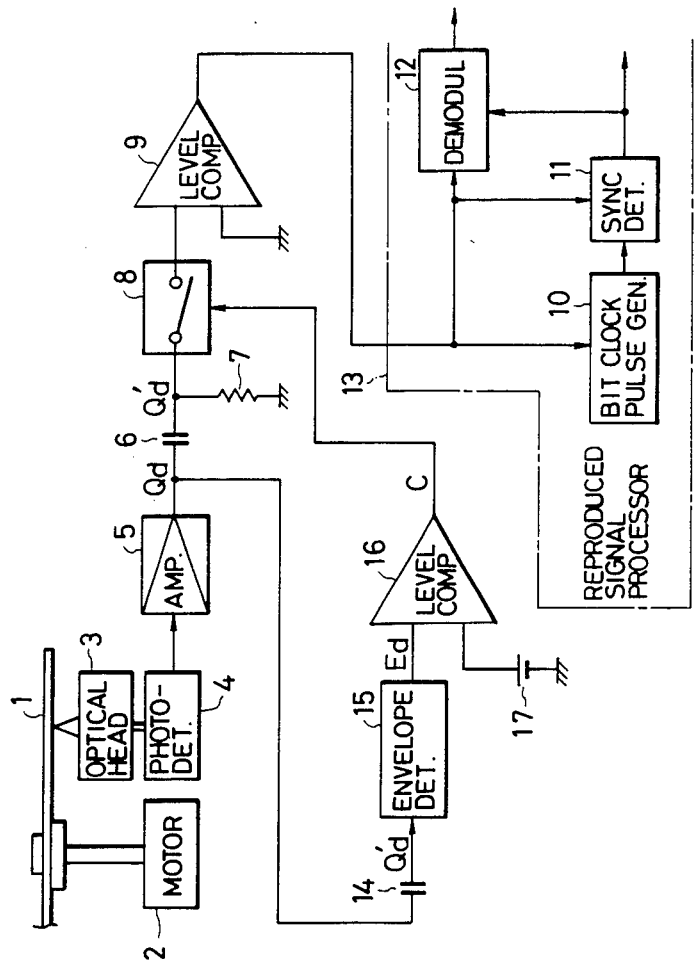
FIG. 2 is a block diagram showing a main part of one embodiment of apparatus for reproducing data signal according to the present invention.

FIG. 2 is an example of an apparatus for reproducing a data signal according to the present invention. This example is operative to reproduce a data signal from an optical disc as a recording medium.

The optical disc 1 has a light reflective recording surface on which a digital data signal modulated in accordance with the run length limited code modulation is recorded with constant recording density, together with a synchronous signal appearing with a pattern of waveform formed with successive two intervals each corresponding to the maximum run length, in the form of small pits arranged in a spiral recording track. This optical disc 1 is rotated by a motor 2 in such a manner that the spiral recording track is scanned at a constant velocity by a reading light beam from an optical head 3. The optical head 3 is positioned to face to the light reflective recording surface of the optical disc 1 for causing the reading light beam to impinge on the light reflective recording surface and for guiding the reading light beam which is modulated in intensity in accordance with the arrangement of the pits and reflected at the light reflective recording surface to a photodetecting portion 4 for producing a head output signal. The output terminal of the photodetecting portion 4 is connected to an amplifying circuit 5 and the output terminal of the amplifying circuit 5 is connected through a capacitor 6 for blocking DC current, a resistor 7 and a switch 8 to one of the input terminals of a level comparing circuit 9 forming a waveform shaping portion. The other of the input terminals of the level comparing circuit 9 is grounded and the output terminal of the level comparing circuit 9 is connected to input terminals of a bit clock pulse generating circuit 10, a synchronous signal detecting circuit 11 and a demodulating circuit 12. The output terminal of the bit clock pulse generating circuit 10 is connected to the synchronous signal detecting circuit 11 and the output terminal of the synchronous signal detecting circuit 11 is connected to the demodulating circuit 12. These bit clock pulse generating circuit 10, synchronous signal detecting circuit 11 and demodulating circuit 12 form a part of a reproduced signal processor 13.

The output terminal of the amplifying circuit 5 is also connected through a capacitor 14 for blocking DC current to the input terminal of an envelope detecting circuit 15. The output terminal of the envelope detecting circuit 15 is connected to one of the input terminals of a level comparing circuit 16 and a voltage source 17 for supplying a reference voltage is connected to the other of the input terminals of the level comparing circuit 16. The output terminal of the level comparing circuit 16 is connected to the control terminal of the switch 8 so that the switch 8 is controlled to take the ON state and the OFF state selectively in response to the output of the level comparing circuit 16.

With the arrangement thus constituted, when the reproduction of the digital data from the optical disc 1 which has a non-reflecting defective portion on the light reflective recording surface thereof is carried out, the photodetecting portion 4 receives the reading light beam reflected at the light reflective recording surface of the optical disc 1 and produces a head output signal in response to the variations in intensity of the received reading light beam. The head output signal is amplified at the amplifying circuit 5 and an amplified head output signal Qd as shown in FIG. 3A is obtained at the output terminal of the amplifying circuit 5. In the FIGS. 3A to 3D, $t_1$ and $t_5$ show the periods in which the reading light beam from the optical head 3 impinges on the normal portion of the light reflective recording surface of the optical disc 1 without being harmfully affected by the non-reflecting defective portion, respectively, $t_3$ shows the period in which the reading light beam impinges on the non-reflecting defective portion, and $t_2$ and $t_4$ show the periods in which the reading light beam impinge on the portions of the light reflective recording surface at the front and the rear of the non-reflecting defective portion, respectively. During each of the periods $t_1$ and $t_5$, the amplified head output signal Qd obtained from the amplifying circuit 5 varies in relatively large amplitude with a predetermined DC level, that is, a normal head output signal obtained in the normal reading condition is derived from the amplifying circuit 5. During the period $t_3$, the amplified head output signal Qd obtained from the amplifying circuit 5 is substantially zero. Then, during the periods $t_2$ and $t_4$, the amplified head output signal Qd obtained from the amplifying circuit 5 has the reduced amplitude and the lowered DC level, that is, a head output signal obtained from the portions of the light reflective recording surface at the front and the rear of the non-reflecting defective portion is derived from the amplifying circuit 5. This head output signal obtained from the portions of the light reflective recording surface at the front or the rear of the non-reflecting defective portion is deteriorated in frequency characteristic and brings the possibility of erroneous detection of a false synchronous signal in the reproduced signal processor 13.

The amplified head output signal Qd derived from the amplifying circuit 5 is changed through the capacitor 6 into a modified head output signal Qd' with a zero DC level, as shown in FIG. 3B, and supplied to one of the input terminals of the level comparing circuit 9 when the switch 8 is in the ON state. Since the other input terminal of the level comparing circuit 9 is grounded, the level of the modified head output signal Qd' is compared with the zero level in the level comparing circuit 9, and a rectangular reproduced signal which takes the level of "1" when the level of the modified head output signal Qd' is equal to or higher than the zero level and the level of "0" when the level of the modified head output signal Qd' is lower than the zero level is obtained from the level comparing circuit 9. That is, the waveform shaping of the modified head output signal Qd' with a zero cutting level is conducted. The rectangular reproduced signal from the level comparing circuit 9 is supplied to the reproduced signal processor 13. Then, in the reproduced signal processor 13, bit clock pulses are generated in accordance with the rectangular reproduced signal, a synchronous signal contained in the rectangular reproduced signal is detected and the rectangular reproduced signal is demodulated with the generated bit clock pulses in the condition of synchronism with the detected synchronous signal, and as a result, demodulated digital data are produced.

The amplified head output signal Qd derived from the amplifying circuit 5 is also changed through the capacitor 14 into the modified head output signal Qd' with the zero DC level, as shown in FIG. 3B, to be supplied to the envelope detecting circuit 15. The envelope detecting circuit 15 is operative to detect the amplitude of the modified head output signal Qd' and to produce an envelope detected output Ed varying in response to the variations in amplitude of the modified head output signal Qd', that is, in response to the variations in amplitude of the amplified head output signal Qd, as shown in FIG. 3C. The envelope detected output Ed takes a high level Vd with little variations in the periods $t_1$ and $t_5$, a level descending rapidly from the level Vd in the period $t_2$, a zero level in the period $t_3$ and a level ascending rapidly to the level Vd in the period $t_4$, and is supplied to one of the input terminals of the level comparing circuit 16. On the other hand, the reference voltage from the voltage source 17 is supplied to the other of the input terminals of the level comparing circuit 16, so that a DC level Vs at the other of the input terminals of the level comparing circuit 16 is set to be lower than the level Vd which the envelope detected output Ed takes in the periods $t_1$ and $t_5$, as shown in FIG. 3C. With this arrangement, the level comparing circuit 16 produces an output C taking a high level h when the level of the envelope detected output Ed is higher than the level Vs and a low level l when the level of the envelope detected output Ed is equal to or lower than the level Vs, as shown in FIG. 3D.

The output C takes the high level h in the period $t_1$ and in the beginning of the period $t_2$, the low level l during a period from a time point at which the amplitude of the amplified head output signal Qd becomes smaller than a predetermined value in the period $t_2$ to a time point at which the amplitude of the amplified head output signal Qd becomes larger than the predetermined value again in the period $t_4$, and then the high level h again in the end of the period $t_4$ and in the period $t_5$. This results in that the output C takes the low level l when the amplified head output signal Qd is deteriorated in frequency characteristic and brings the possibility of erroneous detection of the false synchronous signal in the reproduced signal processor 13 in the periods $t_2$ and $t_4$.

The output C thus obtained is supplied to the control terminal of the switch 8 to control with the high level h thereof the switch 8 to be turned on so that the modified head output signal Qd' is supplied to one of the input terminals of the level comparing circuit 9 and to control with the low level l thereof the switch 8 to be turned off so that the modified head output signal Qd' is prevented from being supplied to one of the input terminals of the level comparing circuit 9.

Accordingly, when the amplified head output signal Qd is deteriorated in frequency characteristic and brings the possibility of erroneous detection of the false synchronous signal in the reproduced signal processor 13 in the periods $t_2$ and $t_4$, the modified head output signal Qd' is not supplied to one of the input terminals of the level comparing circuit 9 and therefore the rectangular reproduced signal is not supplied to the reproduced signal processor 13. Consequently, it is surely avoided that the false synchronous signal is erroneously detected in the reproduced signal processor 13.

Although the switch 8 is disposed on the input side of the level comparing circuit 9 and therefore the rectangular reproduced signal is not derived from the level comparing circuit 9 when the switch 8 is turned off in the aforementioned example, it is possible to provide the switch 8 on the output side of the level comparing circuit 9 so that the rectangular reproduced signal is obtained from the level comparing circuit 9 regardless of the operation of the switch 8 and the rectangular reproduced signal is prevented from being supplied to the reproduced signal processor 13 when the switch 8 is turned off.

Further, it is to be understood that the configuration of the main part of the apparatus for reproducing a data signal according to the present invention is not limited to the example described above, and various changes and modifications may be effected therein without departing from the scope or concept of the present invention in which the amplitude of the head output signal obtained from the recording medium is detected and the rectangular reproduced signal is prevented from being supplied to the reproduced signal processor when the detected amplitude of the head output signal is less than a predetermined value.

The apparatus for reproducing a data signal according to the present invention is capable of reproducing demodulated digital data superior in quality without being harmfully affected by defects provided undesirably on a recording surface of a recording medium on which a digital data signal modulated in accordance with the run length limited code modulation is recorded together with a synchronous signal, and is therefore suitable for being constituted to be a player for an optical digital audio disc or the like on which a digitalized audio signal is recorded.

What is claimed is:

1. An apparatus having a reproducing head for reproducing a recorded digital data signal modulated in accordance with a modulation system in which the interval between each two successive level transitions from one to the other of two different levels corresponding to binary data, respectively, is provided in a predetermined manner, the data signal being recorded on a recording medium together with a synchronous signal, the apparatus comprising: waveform shaping means for obtaining a reproduced signal of rectangular waveform resulting from comparing the level of the reproducing head output signal with a predetermined level; reproduced signal processing means including a synchronous signal detector being supplied with the reproduced signal of rectangular waveform for detecting said synchronous signal recorded with said digital data signal and producing an output therefrom and a demodulating circuit receiving said reproduced signal of rectangular waveform and said output from said synchronous signal detector; amplitude detecting means including an envelope detector for detecting the amplitude of the envelope of the reproducing head output signal and a level comparing means for comparing the envelope amplitude level with a nonzero reference level and producing an output signal indicative thereof; and interrupt means responsive to said output signal from said amplitude detecting means for preventing the reproduced signal of rectangular waveform obtained by the waveform shaping means from being supplied to the reproduced signal processing means when the envelope amplitude of the reproducing head output signal detected by the amplitude detecting means is less than a predetermined value, whereby erroneous detection of a synchronous signal by said synchronous signal detector is prevented.

2. Apparatus for reproducing a data signal according to claim 1, wherein said interrupt means for preventing the reproduced signal of rectangular waveform from being supplied to the reproduced signal processing means comprises a switch provided on an input of the waveform shaping means, said switch being operably controlled by an output of the amplitude detecting means so as to be opened when the amplitude of the reproducing head output signal is less than the predetermined value.

3. Apparatus for reproducing a data signal according to claim 2, wherein said amplitude detecting means comprises an envelope detecting portion supplied with the reproducing head output signal and a level comparing circuit for comparing an output of the envelope detecting portion with the predetermined value.

4. Apparatus for reproducing a data signal according to claim 3, wherein said reproducing head output signal is supplied through a first coupling capacitor to the envelope detecting portion.

5. Apparatus for reproducing a data signal according to claim 1, 2, 3 or 4, wherein said waveform shaping means comprises a level comparing circuit for comparing the reproducing head output signal having been passed through a second coupling capacitor with a zero voltage reference level.

6. Apparatus for reproducing a data signal according to claim 1, wherein said interrupt means comprises a switch provided on an output of said waveform shaping means, said switch being operably controlled by said output signal from said amplitude detecting means so as to be opened when the amplitude of the reproducing head output signal is less than the predetermined value.

7. Apparatus for preventing erroneous detecting of a false synchronization signal during reproduction of a recorded digital data signal, the apparatus has a reproducing head producing an output signal and the recorded digital data signal is modulated in accordance with a modulation code in which the interval between two successive level transitions corresponding to binary data, is selected in a predetermined fashion and the data signal is recorded along with a frame synchronization signal having a same format as the digital data signal, the apparatus comprising:

waveform shaping means for producing a reproduced rectangular waveform signal by comparing the reproducing head output signal with a first predetermined level;

reproduced signal processing means including synchronous signal detecting means receiving said reproduced rectangular waveform signal for detecting said synchronization signal and producing an output signal therefrom and demodulating means receiving said reproduced rectangular waveform signal and said output from said synchronous signal detecting means for synchronously producing therefrom demodulated digital data;

amplitude detecting means receiving said reproducing head output signal for detecting the amplitude thereof, comparing said detected amplitude with a second predetermined level, and producing a control signal based upon the comparison of the detected amplitude of said reproducing head output signal; and signal interrupt means receiving said control signal and being connected to said waveform shaping circuit to prevent said rectangular waveform signal from being fed to said reproduced signal processing means upon the amplitude of the reproducing head output signal being detected by said amplitude detecting means to be less than a predetermined value, whereby erroneous detection of the synchronization signal by said synchronous signal detecting means is prevented.

8. Apparatus for reproducing a data signal according to claim 7, wherein said interrupt means for preventing the reproduced rectangular waveform signal from being fed to the reproduced signal processing means comprises a switch connected to an input of said waveform shaping means and being operable in response to said control signal from said amplitude detecting means whereby said input is disconnected when the amplitude of the reproducing head output signal is less than said predetermined value.

9. Apparatus for reproducing a data signal according to claim 7, wherein said interrupt means for preventing the reproduced rectangular waveform signal from being fed to said reproduced signal processing means comprises a switch connected to the output of said waveform shaping means and being operable in response to said control signal from said amplitude detecting means, whereby said output of said waveform shaping means is disconnected when the amplitude of the said reproducing head output signal is less than said predetermined value.

10. Apparatus for reproducing a data signal according to claim 7, wherein said amplitude detecting means comprises an envelope detecting circuit receiving said reproducing head output signal, a reference voltage source producing said second predetermined level, and a level comparing circuit for comparing an output signal of said envelope detecting circuit with said second predetermined level.

* * * * *